(12) United States Patent
Landerl et al.

(10) Patent No.: US 10,247,240 B2
(45) Date of Patent: Apr. 2, 2019

(54) ANGULAR CONTACT BALL BEARING CAGE

(71) Applicant: Aktiebolaget SKF, Gothenburg (SE)

(72) Inventors: Helmut Landerl, Steyr (AT); Alexander Mocnik, Steyr (AT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/807,944

(22) Filed: Nov. 9, 2017

(65) Prior Publication Data

US 2018/0135696 A1 May 17, 2018

(30) Foreign Application Priority Data

Nov. 17, 2016 (DE) .................. 10 2016 222 683

(51) Int. Cl.
*F16C 33/38* (2006.01)
*F16C 19/16* (2006.01)

(52) U.S. Cl.
CPC .......... *F16C 33/385* (2013.01); *F16C 19/163* (2013.01); *F16C 2204/14* (2013.01); *F16C 2204/20* (2013.01); *F16C 2240/30* (2013.01); *F16C 2300/22* (2013.01)

(58) Field of Classification Search
CPC ................ F16C 19/163; F16C 33/3837; F16C 33/3843; F16C 33/385; F16C 33/3887
See application file for complete search history.

(56) References Cited

U.S. PATENT DOCUMENTS 5,906,441 A * 5/1999 Seki ....................... F16C 19/163
384/523

FOREIGN PATENT DOCUMENTS

DE 102012206376 B3 * 10/2013 ............ F16C 19/163
DE 202015003359 U1 * 6/2015 ............ F16C 33/385
JP 2007146896 A * 6/2007 .......... F16C 33/3887

* cited by examiner

*Primary Examiner* — Phillip A Johnson
(74) *Attorney, Agent, or Firm* — Bryan Peckjian; SKF USA Inc. Patent Dept.

(57) ABSTRACT

An angular contact ball bearing cage includes a plurality of pockets. At least one imaginary sectional plane extends through a first pocket, and the sectional plane is located such that an axis of rotation of the angular contact ball bearing cage lies in the sectional plane. The axis of rotation is an axis about which the angular contact ball bearing cage is configured to rotate in operation. A geometric centerpoint of the first pocket lies in the sectional plane, and an intersection of the sectional plane and a side of the first pocket includes a first portion that is not linear and that does not lie on the surface of a cone.

9 Claims, 2 Drawing Sheets

ANGULAR CONTACT BALL BEARING CAGE

CROSS-REFERENCE

This application claims priority to German patent application no. 10 2016 222 683.5, filed on Nov. 17, 2016, the contents of which are fully incorporated herein by reference.

TECHNOLOGICAL FIELD

The invention is directed to an angular contact ball bearing cage having a plurality of pockets, where the pockets are configured for improved bearing operation.

BACKGROUND

A ball-guided angular contact ball bearing cage including a plurality of pockets is known.

SUMMARY

An aspect of the disclosure comprises a cage of the above-mentioned type that is well-suited for high rotational speeds.

A ball-guided angular contact ball bearing cage is configured to retain a plurality of balls and to rotate around an axis of rotation. According to a disclosed embodiment, a ball-guided angular contact ball bearing cage is configured such that there is at least one sectional plane (an imaginary plane) that extends through one of the pockets at a location such that the axis of rotation of the angular contact ball bearing cage lies in the sectional plane. A geometric centerpoint of the first pocket also lies in the sectional plane. Furthermore, the sectional plane is free of pocket surface regions that are formed by straight sections and that extend obliquely with respect to one another. In other words, the intersection of the sectional plane and the side of the pocket does not lie on a surface of a cone and at least part of the line of intersection is not linear. A "geometric centerpoint" of a pocket should be understood in particular to be that point that is given by a vector that is obtained when the vector function f(x)=x, wherein x is to be a vector here, is integrated over the surface of the pocket and divided by the surface area of the surface of the pocket. The above definition of the geometric centerpoint is thus in particular analogous to the definition of a center of mass. According to the disclosure the angular contact ball bearing cage is suited for high rotational speeds. With such a configuration, the surface of the pocket nestles the ball and in particular a good lubrication is thereby provided. In particular the osculation between ball and cage is reduced so that the contact surface between ball and cage is larger. In particular, an operation of an angular contact ball bearing including the disclosed cage causes results in only a small temperature increase, which in the case of a grease lubrication leads to a long service life of the grease.

Preferably only pocket surface regions that are given by kink-free curves lie in the sectional plane. Expressed in mathematical language, this means nothing more than that the curves are continuously differentiable. It can thereby be achieved that the surface of the pocket nestles the ball particularly closely, whereby a particularly good lubrication is achieved.

The cage pocket angle of the first pocket advantageously falls between 10° and 15°. A low weight of the angular contact ball bearing cage can thereby be achieved. In particular, due to the low weight, low centrifugal forces act on the angular contact ball bearing cage in operation, with the result that very high rotational speeds are achievable using the cage. Furthermore in particular a low radial cross-sectional width of the angular contact ball bearing cage can be achieved. Furthermore a stock part from which the angular contact ball bearing cage is manufactured and which has the shape of a hollow cylinder, has a small wall thickness, with the result that less waste occurs in the manufacturing of the angular contact ball bearing cage. In particular a cost-effective construction can be achieved.

An opening, into which the first pocket opens in a radial outer region of the angular contact ball bearing cage, preferably has a shape of a slot—that is, it is elongated. This causes the ball, which sits in the pocket in operation, to have different clearance in the axial direction and in the circumferential direction, which leads to a stable, low-noise, and smooth operation of the angular contact ball bearing cage, in particular in comparison to the case wherein the axial clearance and the clearance in the circumferential direction are the same. In particular the clearance in the axial direction is low, which results in a reduction of the cage load in the event of impacts and vibrations. The last-mentioned leads in particular to a lower-vibration, quieter operation with less wear.

Further advantages will be apparent from the following description of the drawings. An exemplary embodiment of the disclosure is depicted in the drawings. The drawings, the description, and the claims contain numerous features in combination. The person skilled in the art will also advantageously consider the features individually and combine them into further meaningful combinations.

DETAILED DESCRIPTION

FIGS. 1-5 show various views or sections of an inventive angular contact ball bearing cage. The angular contact ball bearing cage includes a first pocket 10 and further pockets, which are configured exactly like the pocket 10.

Figure 1:
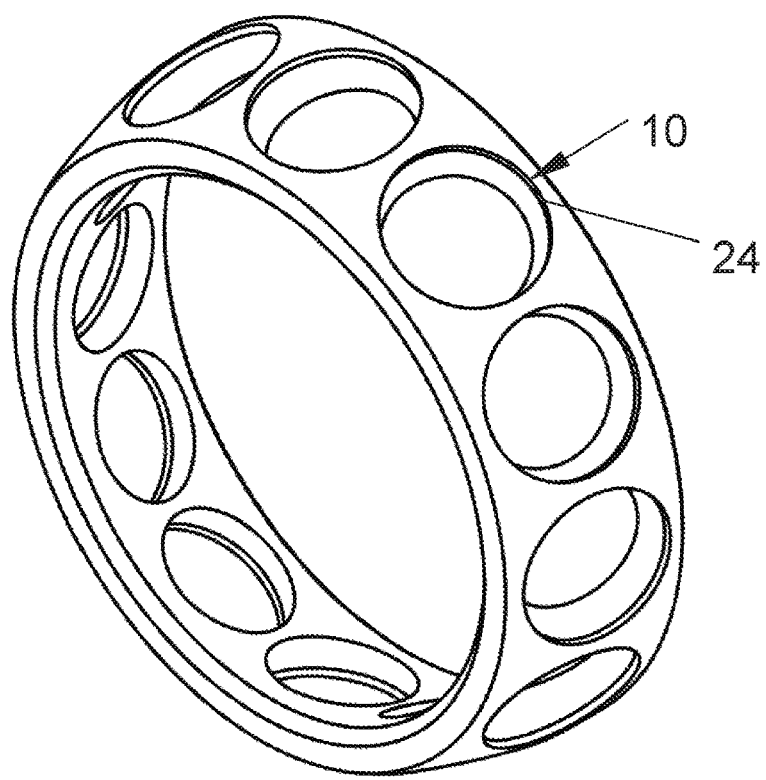
FIG. 1 is a perspective view of an angular contact ball bearing cage according to the present disclosure.
Figure 2:
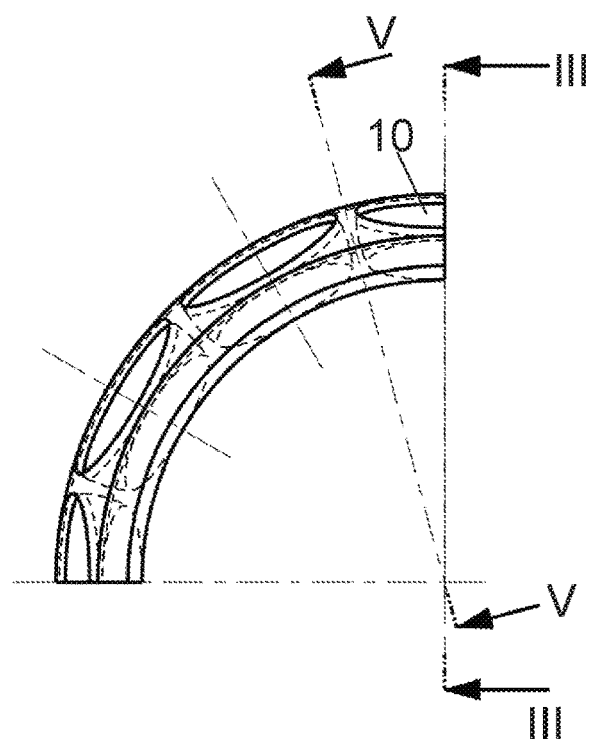
FIG. 2 is an elevational view of a quarter of the angular contact ball bearing cage of claim 1 looking in the axial direction.
Figure 3:
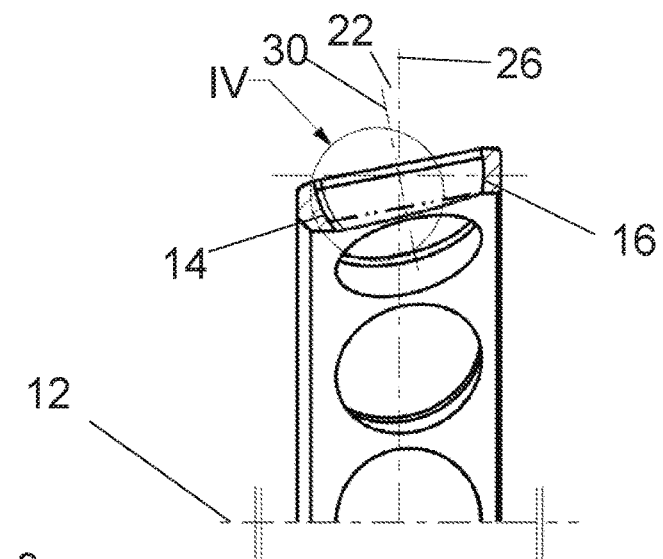
FIG. 3 is a sectional view taken along line III-III in FIG. 2.
Figure 4:
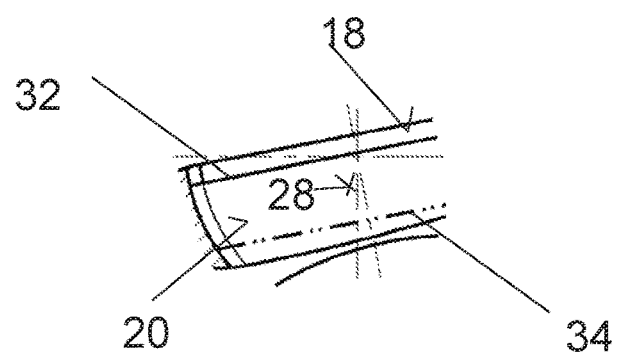
FIG. 4 is an enlarged region from FIG. 3.

FIG. 3 shows a sectional plane through the pocket 10 located such that an axis of rotation 12 of the angular contact ball bearing cage lies in the sectional plane. The axis of rotation is the axis about which the angular contact ball bearing cage rotates in operation. Furthermore a geometric centerpoint 28 of the pocket 10 also lies in the sectional plane. The sectional plane in FIG. 3 is free of pocket surface regions 14, 16 of the pocket 10, which are formed by straight sections and which extend obliquely with respect to one another. In other words, the intersection of the sectional plane and the side of the pocket does not lie on a surface of a cone and at least part of the line of intersection is not linear. Rather, the pocket surface regions 14, 16 are curve pieces that arise on the surface of a torus. Furthermore, the pocket surface regions 14, 16 are provided by kink-free curves, i.e., by continuously differentiable curves.

Furthermore the pocket 10 includes a first surface region 18, which is disposed on a radially outer side of the pocket 10. The first surface region 18 is an inner surface region of a hollow cylinder having a circular base surface. A second surface region 20 of the pocket 10 is disposed on a radially inner side of the pocket 10. The second surface region 20 has the geometry of an outer surface region of a torus.

An opening 24, into which the first pocket 10 opens in a radially outer region of the angular contact ball bearing cage has a shape of a slot—that is, is elongated. A maximum extension of the slot extends in the circumferential direction of the angular contact ball bearing cage. The geometry of the slot is that which is obtained when a circle is divided into two equal parts, the resulting halves here are removed from each other perpendicularly to the separation direction of the circle, and the open ends of the semicircle are connected to one another by equally long lines without overcrossing. Due to the mirror- and point-symmetrical design of the slot a centerpoint of the slot can be defined. A central axis 30 of the pocket 10 is then defined such that the central axis extends through the centerpoint of the slot. A cage pocket angle 22 of the pocket 10 is that acute angle that is between the central axis and a line intersecting it that in turn perpendicularly intersects the axis of rotation 12. The cage pocket angle 22 is 11°.

The pocket 10 includes a radially upper part, which has the geometry of a surface of a cylinder. The cylinder concerned is not a circular cylinder, i.e., not a cylinder having a circle as the base contour. Instead, the cylinder concerned has the opening 24 as the base contour.

Figure 5:
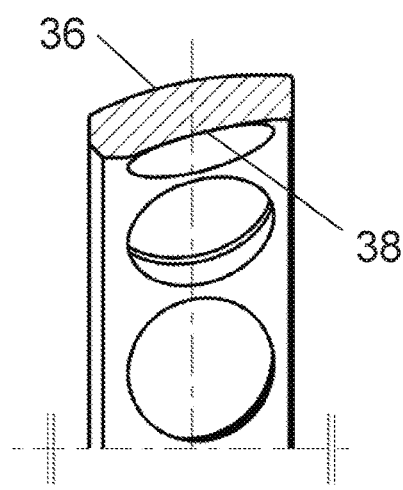
FIG. 5 is a sectional view taken along line V-V in FIG. 2.

Closed contact lines 32, 34 of the pocket 10 represent the possible contact points lying farthest radially inward or farthest radially outward of the cage with the ball, which contact points are located in the pocket in an operating state. The contact lines each have a distance greater than zero to the radially outer surface and to the radially inner surface of the cage, so that the ball is prevented—even with wear of the cage—from rolling on an end edge of the pocket 10 in operation and lubricant is not removed from the ball by contact with the end edge. At each of its points the radially outer-lying contact line has the minimum necessary distance to the radially outer surface of the cage, by which it is thereby achieved that the radially outer surface of the cage includes a first crown 36. Likewise at each of its points the radially inner-lying contact line has the minimum necessary distance to the radially inner surface of the cage, by which it is also thereby achieved that the radially inner surface of the cage includes a further crown 38 (FIG. 5).

The angular contact ball bearing cage is made of brass or aluminum. In the installed state the angular contact ball bearing cage is part of an angular contact ball bearing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ball-guided angular contact ball bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Pocket
12 Axis of rotation
14 Pocket surface region
16 Pocket surface region
18 Surface region
20 Surface region
22 Cage pocket angle
24 Opening
26 Verticals
28 Centerpoint
30 Central axis
32 Contact line
34 Contact line
36 Crown
38 Crown

What is claimed is:

1. An angular contact ball bearing cage comprising a plurality of pockets,
    wherein at least one sectional plane extends through a first pocket,
    wherein the sectional plane is located such that an axis of rotation of the angular contact ball bearing cage lies in the sectional plane,
    wherein the axis of rotation is an axis about which the angular contact ball bearing cage is configured to rotate in operation,
    wherein a geometric centerpoint of the first pocket lies in the sectional plane,
    wherein an intersection of the sectional plane and a side of the first pocket includes a first portion and a second portion, the first portion is not linear and does not lie on the surface of a cone, the second portion is located radially upwardly relative to the first portion and lies on an imaginary hollow cylinder having a non-circular base, and
    wherein an opening into which the first pocket opens is in a radially outer region of the angular contact ball bearing cage and has the shape of a slot, wherein the slot has a maximum extension in a circumferential direction.

2. The angular contact ball bearing cage according to claim 1, wherein the first portion is differentiable at all points.

3. The angular contact ball bearing cage according to claim 1, wherein the first portion lies on a surface of a torus.

4. The angular contact ball bearing cage according to claim 3, wherein a cage pocket angle of the first pocket is from 10° to 15°.

5. The angular contact ball bearing cage according to claim 1, wherein the first portion lies on a surface of a torus.

6. The angular contact ball bearing cage according to claim 5, wherein a cage pocket angle of the first pocket is from 10° to 15°.

7. The angular contact ball bearing cage according to claim 1, wherein the angular contact ball bearing cage is made of brass and/or aluminum.

8. The angular contact ball bearing cage according to claim 1, wherein at least one part of a radially outer surface of the angular contact ball bearing cage is curved in an axial direction.

9. An angular contact ball bearing including an angular contact ball bearing cage according claim 1.

* * * * *